US006388949B1

(12) United States Patent
Lenhardt

(10) Patent No.: US 6,388,949 B1
(45) Date of Patent: May 14, 2002

(54) MARINE TURTLE ACOUSTIC REPELLENT/ALERTING APPARATUS AND METHOD

(75) Inventor: Martin L. Lenhardt, Hayes, VA (US)

(73) Assignee: Sound Technique Systems LLC, Arlington, VA (US)

( * ) Notice: Subject to any disclaimer, the term of this patent is extended or adjusted under 35 U.S.C. 154(b) by 0 days.

(21) Appl. No.: 09/649,991

(22) Filed: Aug. 29, 2000

Related U.S. Application Data

(60) Provisional application No. 60/151,356, filed on Aug. 30, 1999.

(51) Int. Cl.⁷ .......................... H04B 1/02; A01M 29/02
(52) U.S. Cl. ...................................... 367/139; 116/22 A
(58) Field of Search ........................ 367/139; 116/22 A

(56) References Cited

U.S. PATENT DOCUMENTS

| | | | |
|---|---|---|---|
| 4,538,249 A | 8/1985 | Richard | 367/94 |
| 4,624,220 A | 11/1986 | Olsson | 122/379 |
| 4,646,276 A | 2/1987 | Kowalewski et al. | 367/139 |
| 4,805,339 A | 2/1989 | Fuentes et al. | 43/42.31 |
| 4,922,468 A | 5/1990 | Menezes | 367/139 |
| 4,955,005 A | 9/1990 | Loeffelman | 367/139 |
| 5,012,457 A | 4/1991 | Mitchell et al. | 367/175 |
| 5,046,278 A | 9/1991 | Szilagyi et al. | 43/17.1 |
| 5,168,473 A | 12/1992 | Parra | 367/124 |
| 5,291,682 A | 3/1994 | Zaccheo | 43/17.1 |
| 5,349,774 A | 9/1994 | Parra | 43/9.2 |
| 5,417,006 A | 5/1995 | Schettino | 43/17.1 |
| 5,448,968 A | 9/1995 | Ostlie | 119/220 |
| 5,559,759 A | 9/1996 | Gerstein et al. | 367/139 |
| 5,563,849 A | * 10/1996 | Hall et al. | 367/127 |
| 5,570,322 A | 10/1996 | Miller | 367/107 |
| 5,602,799 A | 2/1997 | Hecker et al. | 367/139 |
| 5,610,876 A | 3/1997 | Jeffers | 367/139 |
| 5,627,801 A | 5/1997 | Saunders | 367/139 |
| 5,684,755 A | 11/1997 | Saunders | 367/139 |
| 5,730,086 A | 3/1998 | Truebe | 119/219 |
| 5,778,591 A | 7/1998 | Oschman et al. | 43/17.1 |

OTHER PUBLICATIONS

D. Mann et al., "Detection of Ultrasonic tones and simulated dolphin echolocation clicks by a teleost fish, the American shad", J. Acoust. Soc. Am. 104 (1), Jul. 1998, pp. 562–568.

Internet article, "Hearing Capabilities of Selected Fish Species", obtained from www.life.umd.edu/zoology/popperlab/hearingthresholds.htm, article obtained from Internet on Nov. 17, 1998.

Internet article, "Ultrasonic Hearing by American Shad", obtained from www.life.umd.edu/zoology/popperlab/hearingthresholds.htm, article obtained from Internet on Nov. 17, 1998.

"Sea Turtle Research Program Summary Report" —Army Engineering Waterways Experiment Station, Vicksburg, MS; Nov., 1997.

* cited by examiner

Primary Examiner—Ian J. Lobo
(74) Attorney, Agent, or Firm—Foley & Lardner

(57) ABSTRACT

A turtle alerting system and method utilizes an acoustic signal that may be provided in a first, low frequency range, a second, mid-frequency range, or a third, high frequency range. One or more of those acoustic signals may be accompanied and/or modulated by either an ultrasonic signal or a MHz signal, so as to provide a carrier for the acoustic signal. Further, a beam of light may be used as another type of alerting sensor. Lastly, a sonar may be used to steer the system in a direction in which turtles may be located.

28 Claims, 8 Drawing Sheets

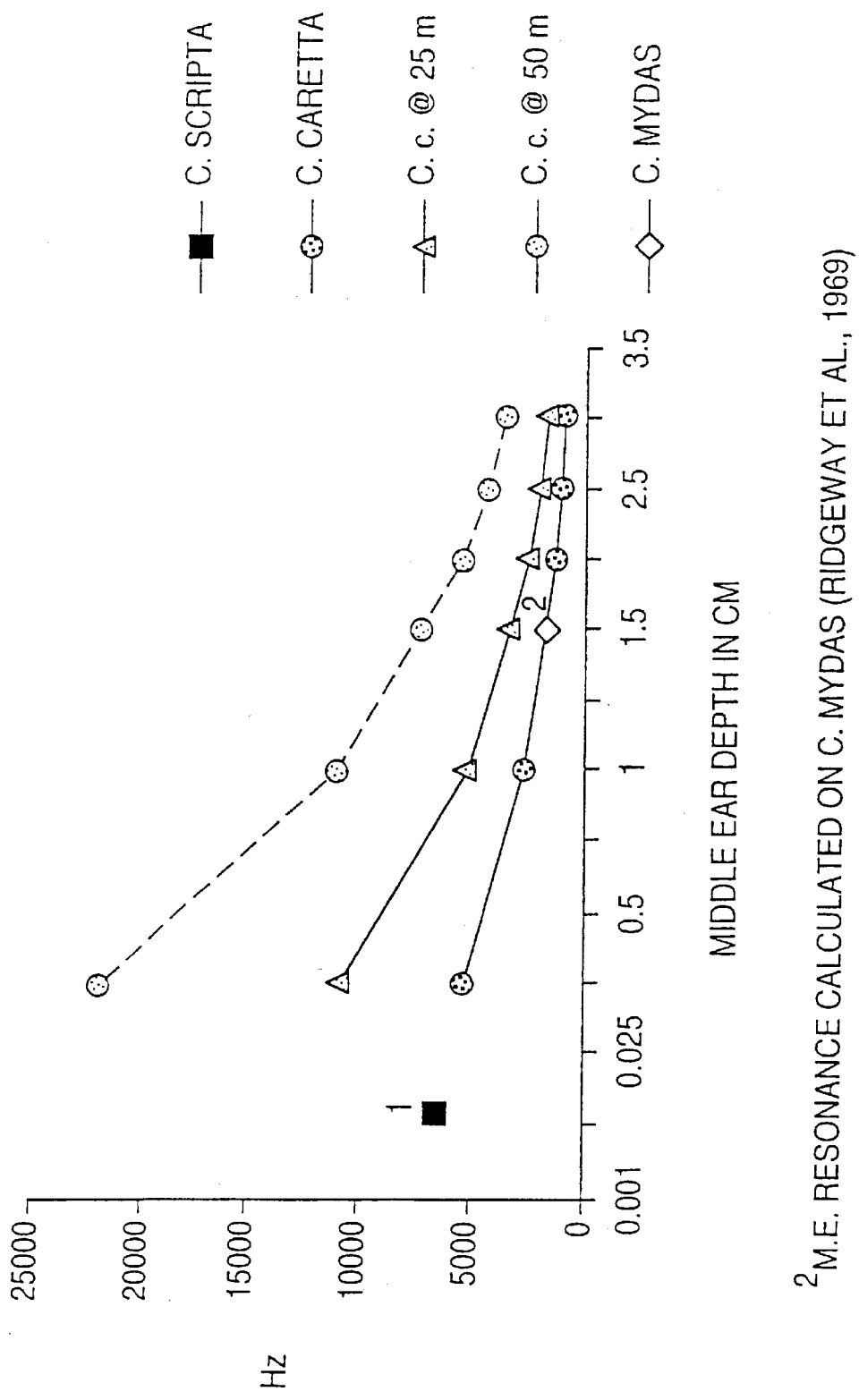
FIG. 4 AQUATIC TURTLE MIDDLE EAR RESONANCE - MODELED AS A CYLINDER AFTER WEVER AND VERNON, 1956
[2] M.E. RESONANCE CALCULATED ON C. MYDAS (RIDGEWAY ET AL., 1969)

FIG. 5   MARINE TURTLE ACOUSTIC DETERRENTS

THREE CLASSES OF AUDIO:

1. <200 Hz
2. 200-900 Hz
3. 900-25,000 Hz

THREE FORMS OF DELIVERY:

1. STANDARD ACCOUSTIC (CAN BE PULSED OR MODULATED)
2. AM ON LOW FREQUENCY ULTRASOUND
3. AM ON MHz ULTRASOUND

- 1. LOW FREQUENCY <200 Hz
- 2. SENSITIVE FREQUENCIES (200-900 Hz)
- 3. MIDDLE EAR RESONANT FREQUENCIES (.9-25 kHz)
- 4. ANY OF THE ABOVE (1-3) AMPLITUDE MODULATED WITH LOW FREQUENCY ULTRASOUND (25-100 kHz)
- 5. ANY OF THE ABOVE (1-3) AMPLITUDE MODULATED WITH MHz FREQUENCIES (0.1 MHz+)

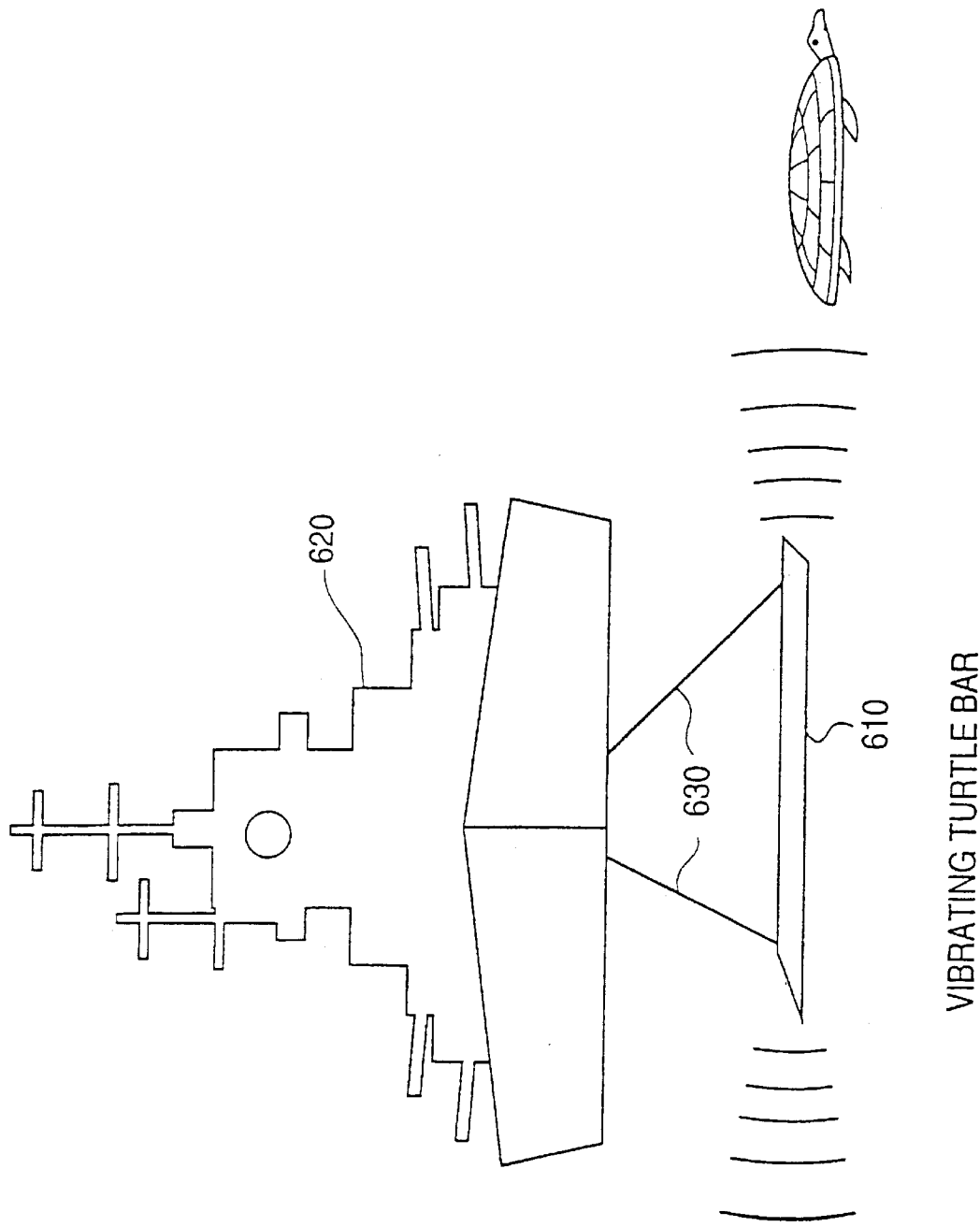

FIG. 7

TURTLE DETERRENT/ALERTING SYSTEM

COMPONENTS

- ACOUSTIC PRESSURE
- ULTRASONIC MODULATION
- TACTILE VIBRATION
- VISUAL REINFORCEMENT

MARINE TURTLE ACOUSTIC REPELLENT/ALERTING APPARATUS AND METHOD

This application claims priority of U.S. Provisional Application No. 60/151,356 filed on Aug. 30, 1999, the entirety of which is hereby incorporated by reference.

BACKGROUND OF THE INVENTION

1. Field of the Invention

The present invention relates to an apparatus and method that is capable of employing up at least three classes of acoustic stimulation for marine turtles based on original behavioral and electrophysiological study of marine turtles. Three modes of delivery can be provided, for example, which include acoustic projection and amplitude modulation on either low frequency (kHz) or high frequency (MHz) ultrasonic carriers. Additionally, two more forms of multi-sensory stimulation can be provided, including vibrational tactile and visual alerting.

2. Description of the Related Art

Turtles evolved over 200 million years ago and have survived two great extinctions, including the reign of dinosaurs, only to fall victim to the perils of modern human life. Marine turtles are in particular jeopardy due to fishing activities and human activity on and around nesting and feeding beaches and shallow waters. Current alarms to warn turtles of possible danger are generally ineffective.

For example, there exist various apparatuses and method for detecting, herding or alerting different types of aquatic life. U.S. Pat. No. 4,538,249, issued to Joseph D. Richard, discloses a low frequency, directional, ultrasonic fish movement detector. Richard's system multiplies (doubles) the frequency of the signal to improve audibility.

U.S. Pat. No. 4,624,220, issued to Mats A. Olsson, discloses an infrasound generator that includes a series of insulated tubes driven by a boiler to create infra-sound. The tubes are attached by a bellows to mechanically insulate the resonator.

U.S. Pat. No. 4,646,276, issued to Janusz J. Kowalewski et al., discloses an acoustic fish behavior control device that is a watertight enclosure filled with gas, with at least one surface that can be made to resonate at its resonant frequency.

U.S. Pat. No. 4,805,339, issued to Gabriel S. F. Fuentes et al., discloses a sonic fishing lure with an enclosed battery, electric circuit, and sonic transducer.

U.S. Pat. No. 4,922,468, issued to John Menezes, discloses a method and apparatus for controlling aquatic population in defined areas. Menezes system provides control by introducing a stimulus (sound, light, particular waves, magnetism) and observing the response. The response, and conditions, are saved in a database to be referenced and updated as needed.

U.S. Pat. No. 4,955,005, issued to Paul H. Loeffelman, discloses an underwater acoustic animal guidance system. This system determines optimum guidance sounds, and reproduces them. Aquatic animals are captured and their sounds recorded, with the recorded sounds analyzed. A primary sound spectrum is varied in accordance with the analyzed spectrum, in order to guide the aquatic animals.

U.S. Pat. No. 5,012,457, issued to Thomas R. Mitchell et al., discloses an aquatic transducer system, which reproduces high-fidelity audio underwater, which detects and monitors underwater activity, and which illuminates an area to detect any movement in that area.

U.S. Pat. No. 5,046,278, issued to Frank Szilagyi et al., discloses a fish caller the generates random high and low frequency noise, so as to simulate noises produced by feeding predatory fish.

U.S. Pat. No. 5,168,473, issued to Jorge M. Parra, discloses a series of transducers that convert bio-sound waves to electric signals, where those signals can be combined with active sonar to form an integrated marine acoustic system. This is combined with global positioning system (GPS) data and digitized maps to display exact locations of fish by species.

U.S. Pat. No. 5,291,682, issued to Nicole I. Zacceo, discloses a fishing net system with one or more underwater speakers attached, and a sound transmitting unit at a remote (on board) location.

U.S. Pat. No. 5,349,774, issued to Jorge M. Parra, discloses a method and apparatus for separating dolphin from tuna, and which is based on the primordial fear of dolphins to killer whales. Killer whale sounds are recorded and manipulated to produced synthesized, feeding killer whale sounds (including infrasonic sounds). These sounds are then broadcast underwater in the vicinity of schools or tuna or dolphins, thereby purportedly scaring the dolphins away.

U.S. Pat. No. 5,417,006, issued to Renato F. Schettino, discloses a device for magnetically separating tuna from dolphins before setting a seine net. Conductors are placed in a water column in a fashion to round up, concentrate and move schools of fish (tuna), while directing undesirable species (dolphins) away from the harvested fish. Artificial magnetic fields are generated by the conductors to perform this task.

U.S. Pat. No. 5,448,968, issued to Lars Ostlie, discloses an infra-acoustic/electric fish fence, which is a barrier for fish that is based on low frequency vibrations and synchronously modulated electric fields. Vertical columns are submerged, with trasducers and electric conductors provided on the columns.

U.S. Pat. No. 5,559,759, issued to Laura A. Gerstein et al., discloses a method of alerting marine mammals and other mammals underwater of the danger of approaching motor vessels. The method provides for projecting of a highly diretional pulsed acoustic signal with an underwater frequency between 3 and 26 kHz. Sound pressure level is tied to the vessel speed. The projection is provided in front of the motor vessel, and also around dangerous structures, thereby purportedly alerting marine mammals to the danger.

U.S. Pat. No. 5,570,322, issued to Michael T. Miller, discloses a barracuda-repelling sound generation device, which generates and transmits sounds and light irritating to barracudas, to purportedly drive them away.

U.S. Pat. No. 5,602,799, issued to George E. Hecker et al., discloses an underwater deterrent system which deters selected species from an underwater deterrence zone. This system pulses water in the opposite direction of the flow of a water source, to purportedly deter fish from intakes of municipal water sources.

U.S. Pat. No. 5,610,876, issued to Robert K. Jeffers, discloses an acoustic deterrent system and method for repelling marine mammals from a region of water. High frequency (7–10 kHz) acoustic signals starting at a low level are gradually or incrementally increased to a level beyond the pain threshold.

U.S. Pat. No. 5,627,801, issued to David N. Saunders, discloses an underwater pinger acoustic resonance chamber, which is designed to maximize acoustic output from a transducer into the surrounding water. Such a device purportedly alerts marine creatures to the existence of a structure located in the water.

U.S. Pat. No. 5,684,755, issued to David N. Saunders, discloses a position-dependent switch to automatically detect deployment. The device is designed to detect up (stowed configuration, attachment ring is up) and down (deployed configuration, attachment ring is down), by using a mercury switch or a ball-type switch.

U.S. Pat. No. 5,730,086, issued to Jonathan Truebe, discloses an apparatus for fish deterrence, which generates a low frequency sound by oscillating a plate attached to a pneumatic piston mounted on a stationary sure. The device is tunable by adjustment of inlet pressure, back pressure, and size, shape and mass of the plate.

U.S. Pat. No. 5,778,591, issued to James I. Oschman et al., discloses a method and apparatus a device that will stun tuna by creating underwater sounds of a selected frequency range to purportedly have a maximum impact on tuna and a minimum impact on dolphins. While each of the above-mentioned devices and methods may be effective to some degree in detecting or alerting aquatic animals, such devices and method are not particularly effective with respect to marine turtles, which are a protected species (endangered or threatened) under U.S. law.

SUMMARY OF THE INVENTION

It is an object of the present invention to provide a turtle alerting apparatus and method which is effective in alerting turtles to a potential danger, such as a moving vessel or a power plant water intake.

The above-mentioned object and other advantages may be accomplished by a turtle alerting system, which includes an acoustic signal generator for generating at least one of a first acoustic signal of less than 200 Hz, a second acoustic signal of between 200 to 900 Hz, and a third acoustic signal of between 900 Hz and 15 kHz. The turtle alerting system also includes an output device for outputting the at least one of the first, second and third acoustic signals. At least one of the first, second and third acoustic signals affect an auditory system of a turtle in order to alert the turtle and cause movement of the turtle.

The turtle alerting system can further include a frequency multiplier for multiplying the at least one of the first, second and third acoustic signals to an ultrasonic frequency range so as to create at least one of a first, second and third ultrasonic signal. The turtle alerting system can still further include an ultrasonic output device for outputting the at least one of the first, second and third ultrasonic signals. At least one of the first, second and third acoustic signals and the at least one of the first, second and third ultrasonic signals affect an auditory system of a turtle in order to alert the turtle and cause movement of the turtle.

The above-mentioned object and other advantages may also be accomplished by a turtle alerting system, which includes an acoustic signal generator for generating at least one of a first acoustic signal of less tan 200 Hz, a second acoustic signal of between 200 to 900 Hz, and a third acoustic signal of between 900 Hz, and 15 kHz. The turtle alerting system also includes an acoustic output device for outputting the at least one of the first, second and third acoustic signals. The turtle alerting system further includes a frequency multiplier for multiplying the at least one of the first, second and third acoustic signals to a particular frequency range so as to create at least one of a first, second and third processed signal. The turtle alerting system still further includes an output device for outputting the at least one of the first, second and third processed signals. At least one of the first, second and third acoustic signals and the at least one of the first, second and third processed signals affect an auditory system of a turtle in order to alert the turtle and cause movement of the turtle.

The above-mentioned object and other advantages may also be accomplished by turtle alerting methods, which include generating at least one of a first acoustic signal of less than 200 Hz, a second acoustic signal of between 200 to 900 Hz, and a third acoustic signal of between 900 Hz, and 15 kHz. The method also includes outputting the at least one of the first, second and third acoustic signals. At least one of the first, second and third acoustic signals affect an auditory system of a turtle in order to alert the turtle and cause movement of the turtle.

The methods may also include providing an ultrasonic signal as a carrier for the first, second and third acoustic signals, as well as providing a light source to be outputted with any of the ultrasonic signal or acoustic signals.

BRIEF DESCRIPTION OF THE DRAWINGS

The above-mentioned object and advantages of the invention will become more fully apparent from the following detailed description when read in conjunction with the accompanying drawings, with like reference numerals indicating corresponding parts throughout, and wherein:

FIG. 4 shows plots of aquatic turtle middle ear resonance for different types of turtles and at different water depths;

FIG. 5 lists various types of marine turtle acoustic deterrents according to the invention;

FIG. 6 shows a vibrating turtle bar that may be utilized in the invention;

FIG. 7 shows the various components of the turtle alerting system according to the invention.

DETAILED DESCRIPTION OF THE INVENTION

Figure 1:
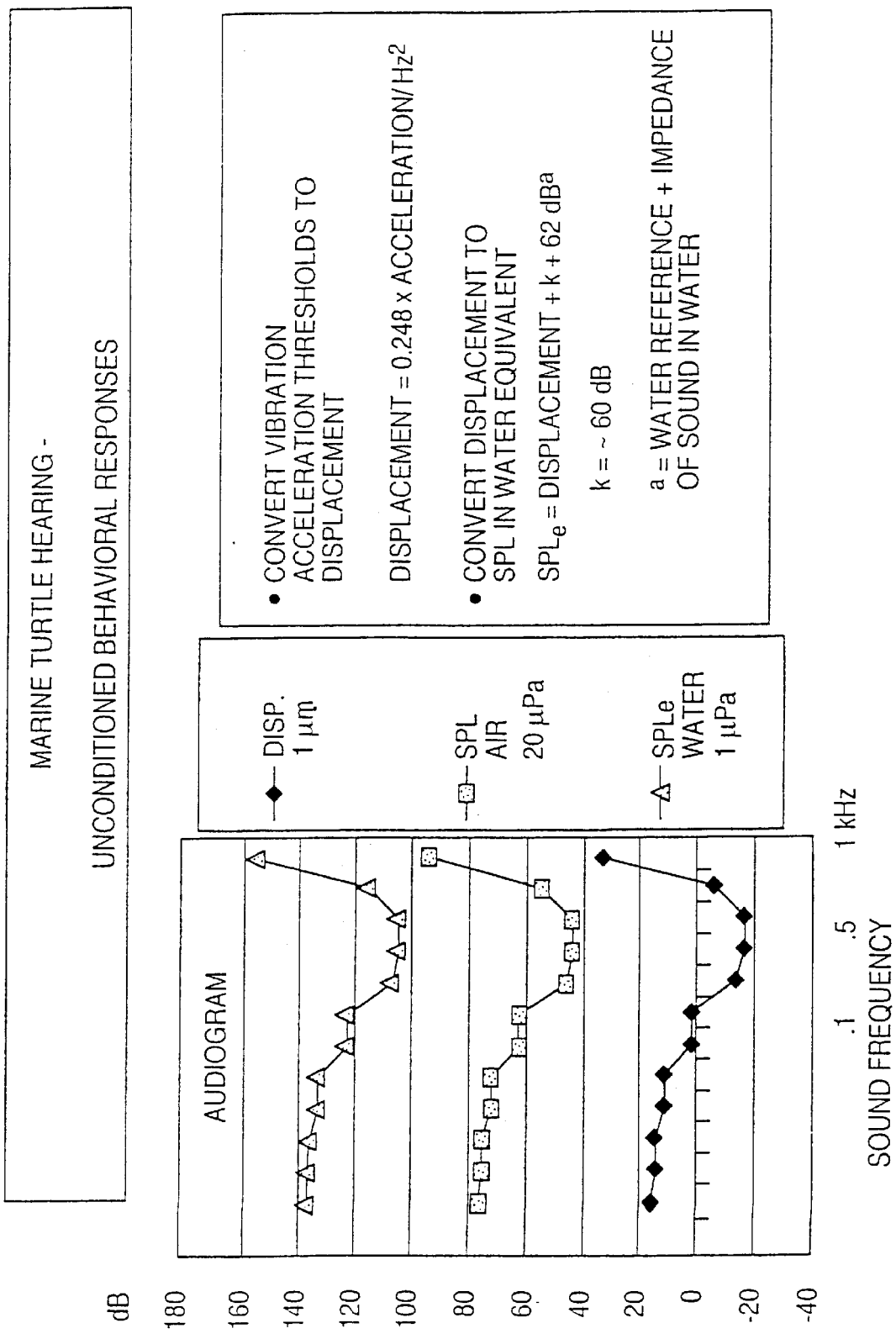
FIG. 1 shows different audiograms of marine turtle hearing.

The present invention will be described in detail below with reference to the drawings.

Turtle Anatomy

Turtles are primitive vertebrates having very conservative features over the past 200 million years. The inventor has recognized that the biomechanics of the turtle ear and shell provide clues to an effective acoustic deterrent/alerting system and method for marine turtles. The system and method are based on the unique method of turtle hearing, and employ stimuli that are optimally processed in the turtle nervous system. While the described embodiments are aquatic in design, terrestrial application is also possible for targeted protected species, such as land-based or burrowing protected species.

While not being limited to any particular theory or hypothesis, the following observations have been made by the inventor.

Turtles have been universally regarded by auditory scientists as primitive with inner ears presumably much like that of the stem reptilian stock that gave rise to advanced reptiles, birds and mammals. Inner ears are made of soft material, and thus no traces of middle ears are found in the fossil records. Nonetheless, skull structure yields important clues. The presence and type of stapes, the presence of an opening to the inner ear (round window) and the presence of an otic notch in the cheek, which generally is interpreted as a basis of a tympanum, all suggest hearing. There is a strong morphological turtle-procophonoid connection based on nine symphonies including an anapsid skull and the presence of an otic notch, a slender stapes, and a round window, establishing a line to about the time of the saursouris and synsouris radiation. However, the anapsid condition has been challenged as derived and the presence of either snakes/lizards or crocodiles/birds as separate evolutionary groups that the turtle has similarities with respect to auditory functions is subject to present debate.

While the turtle phylogenetic connection to the stem reptiles is still clouded, the endorgan of hearing in the fish line that gave rise to terrestrial vertebrates is the saccule, which is an otolith organ that can be stimulated by linear acceleration or vibration. The transition from underwater substrate vibration to terrestrial vibration detection is simple enough to comprehend, but pressure detection of aerial sound poses physical limitations. Based on their anatomy and DNA, the earliest stem reptile could likely detect strong vibrations in the substrate and aerial pressures that vibrated its body. One way of increasing aerial sensitivity through bodily conduction is the coupling of an inertial mass to the inner ear. Together with brain support, the hyoid bone could provide for increased aerial sensitivity. The inner ear would be effective for the frequencies generally associated with the fish saccule.

Examinations of the inner ears of different families of reptiles reveal the turtle ear is basal to all extant species. A small oval basal papilla, unidirectional hair cells, electrical but not mechanical tuning and a frequency response limited to less than 1000 Hz, characterize the turtle ear. By contrast lizards have an elongated basal papilla with electrical and mechanical tuning, multidirectional hair cell and hearing above 5000 Hz, in some species. Crocodile and birds share a similar auditory structure. Turtles have two auditory nuclei in the brainstem whereas lizard and birds have four, thereby tending to reflect other peripheral otic differences.

The presence of an otic notch and a slender stapes does not necessarily infer an impedance matching ear for aerial reception. Quite the opposite, the turtle tympanum is undifferentiated skin over the otic recess in all types of aquatic, semi-aquatic or terrestrial turtles. In fact, the vibratory responsiveness of the skin over the otic recess is no different from that over the remaining facial skin. Thus, the turtle has no eardrum in the sense of a specialized aerial receptor. The shell of the turtle precludes aerial reception by skin receptors as exemplified in snakes. The shell is a conservative morphological feature little changed, other than superficially, over the last 200 million years.

Unlike advanced reptiles, birds and mammals, turtles exhibit no natural startle to aerial sound, although they clearly can detect sound. If the same energy is delivered as vibration to the head or shell, an immediate startle response is observed. The most parsimonious explanation that the inventor has come up with is that turtles hear by bone conduction, where sound is conducted to their inner ear by an osseous route, eventually vibrating the skull. If the skull contents move in unison, the inner ear will not be stimulated, and thus an inertial element is needed, which corresponds to the stapes. The slender stapes acts as a spring in a groove (in the bone) as does the air in the otic notch. The skin on the distal end of the stapes is a mass loading. Thus, the turtle middle ear has both a driving and a damping function. Essentially, turtles have a substrate sensing ear, likely a primitive sensor, that is also can respond to aerial sound, i.e., air pressure displaces the skull, the stapes move differentially due to its inertia. Behavioral thresholds in one semi-aquatic species is about 40 dB SPL, about the level expected for aerial induced bone conduction hearing with a spring and mass coupled middle ear. The turtle ear can thus be conceptualized as an accelerometer with a low pass frequency response.

E. G. Wever, in "The Reptile Ear", Princeton University Press, 1978, found that all of the species in which he recorded cochlear electrical responses had the same basic hearing pattern, irrespective of aerial or vibrational stimulation. The frequency response of the turtle ear falls with the frequency range of fish, that is the turtle has a fish ear that can be stimulated in any fashion that sets the skull or shell into vibration. Antecedents of stem reptiles presumably had a non-aerial ear with the frequency response similar to that of a fish. An ear that would be serviceable in water, land or air would be similar to the inertia system of extant turtles, having a slender stapes with a subdermal air cushion. It is precisely this type of ear that is suggested by the cranial anatomy of proconoids. A shell offers obvious protection but can also be seen as a system to improve substrate coupling and acoustic sound reception in water due to its impedance mismatch.

If the shell serves as an acoustic receptor, then shell mass would limit the high frequency response of the ear. Thus, sea turtles with relatively larger otic structures should retain only low frequency hearing. To test marine turtle hearing, constraints of small tank acoustics and limitation of methods due to confinement imposed by the Endangered Species Act dictated only approaches that would not be invasive nor limit their release into the environment.

Sub-adult marine turtles (*Caretta caretta*), inadvertently captured in pound fishing nets in the Chesapeake Bay, were delivered to the Virginia Institute of Marine Science for health checking and subsequent release. During the few days of captivity hearing testing was performed by the inventor. A complete audiogram was not obtained on any one animal due to the abbreviated testing time. Frequencies were randomly presented to animals and a composite audiogram was developed.

Stimuli were generated in a custom built speaker in which the vibration of air induced by the cone excursion in and out of the magnet was coupled to a water filed bag which was in turn coupled to a fiberglass tank (200 gal.) Sound pressure level in the small tank is notoriously variable, especially in tanks much smaller in diameter than the stimulus wavelength. To avoid this obstacle, vibration at the tank wall was measured by an accelerometer at the speaker tank interface and another accelerometer at the opposite tank wall. The accelerometer measured the bulk fluid movement induced by the speaker at each stimulating frequency. The vibration was measured as acceleration referenced to one g rms.

Hearing threshold was defined as the lowest g level of vibration that induced a behavioral change in the turtles submerged in the tank. The sound induced movement, or behavioral change, was a head retraction and a front flipper twitch. The head and flipper movement was consistently present in the turtles tested and is related to the full head retraction audiogram obtained in only one species of aquatic turtles (in air) by W. C. Patterson, "Hearing in the Turtle", Journal of Auditory Research, vol. 6, pages 453–64, 1966.

The vibration measured as acceleration was converted to its first derivative, displacement, by:

$$\text{Displacement} = {}^{acceleration \times 0.248}/\text{Hz}^2$$

where acceleration is referenced to 1 g rms, and Hz is the frequency (1/sec). The composite marine turtle audiogram for a 0.1 micrometer displacement is presented in FIG. 1. The marine turtles studied have maximum sensitivity between 200 and 500 Hz, with little hearing above 1000 Hz. In fact, a consistent lack of response at 1000 Hz, is followed by a consistent behavioral response in frequencies below 500 Hz. Turtles also respond to frequencies as low as 24 Hz, and probably lower, but tank harmonics prohibit valid testing at these frequencies. This data is similar to the inner ear electrical recording audiogram obtained by S. H. Ridgway, E. G. Wever, J. G. McCormick, J. Palin, and J. H. Anderson, "Hearing in the Giant Sea Turtle (*Chelonia Mydas*)", Proceedings of the National Academy of Sciences, vol. 64, pages 884–890, 1969, using a vibration probe calibrated in displacement (1 $\mu$ meter) in the green sea turtle (*C. mydas*). Invasive surgical procedures performed by these experimenters are no longer permitted. Most importantly, Ridgway et al. also stimulated the turtle ear by sound and measured the level as sound pressure. The resulting air audiogram can be equated to the vibration audiogram because both used the same minimal electrical voltage of the inner ear as a reference of a response.

Figure 2:
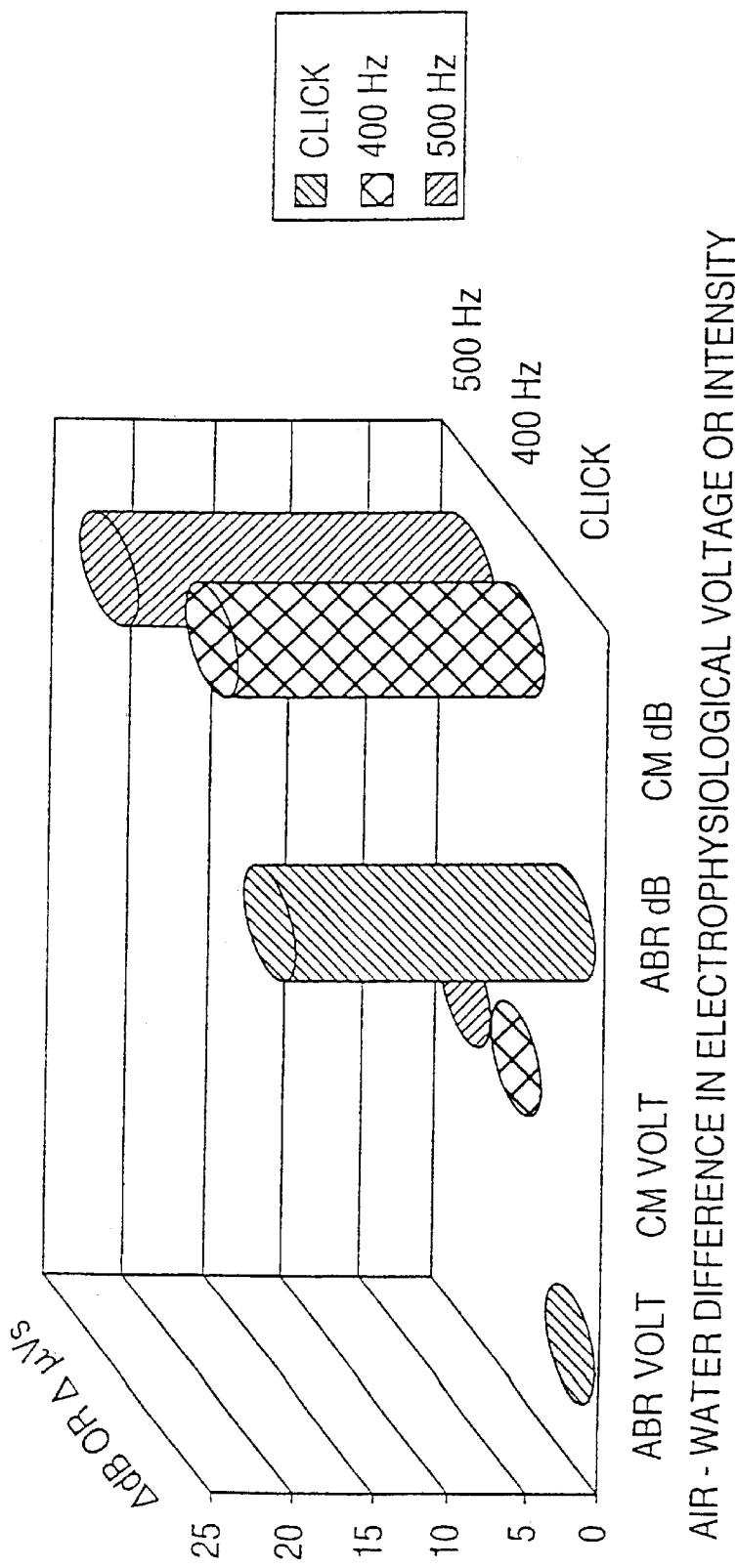
FIG. 2 shows a three-dimensional plot of air-water hearing difference for turtles.

Referring again to FIG. 1, the vibrational audiogram for 1 micrometer of displacement can be converted to equivalent air pressure by adding a constant (k) of 60 dB. The k is the dB difference between displacement and air pressure thresholds which were equated to an inner ear potential of 0.1 $\mu$ V (referred to as the cochlear microphonic). The equivalent sound pressure threshold in water can be determined by the following:

$$SPLe \text{ (water)} = \text{displacement} + k + 62 \text{ dB}$$

where SPLe is the equivalent sound pressure in water referenced to 1 $\mu$ Pa at 1 meter, displacement is the threshold vibration referenced to 1 $\mu$ meter, k=60 dB, and the 62 dB is the difference between the reference level of sound in air (20 $\mu$Pa) and water (1 $\mu$Pa), 26 dB, and the impedance difference between air and water, 36 dB. Wever submerged a small turtle's head below water and found about a 20–23 dB drop in sensitivity using the cochlear microphonic as an index. Two *C. caretta* had click-evoked potentials using noninvasive neurophysiological auditory brainstem response (ABR) recorded in air and in very shallow (0.5 m) water. The result was a 0.11 $\mu$V drop in the ABR with a subtle lengthening in latency of the wave V. This suggests that the loss in sensitivity was due to water loading of the eardrum. A 0.11 $\mu$V is equal to about a 20 dB lowering of the click intensity. These data are similar and portrayed graphically in FIG. 2 as a three-dimensional plot.

Figure 3:
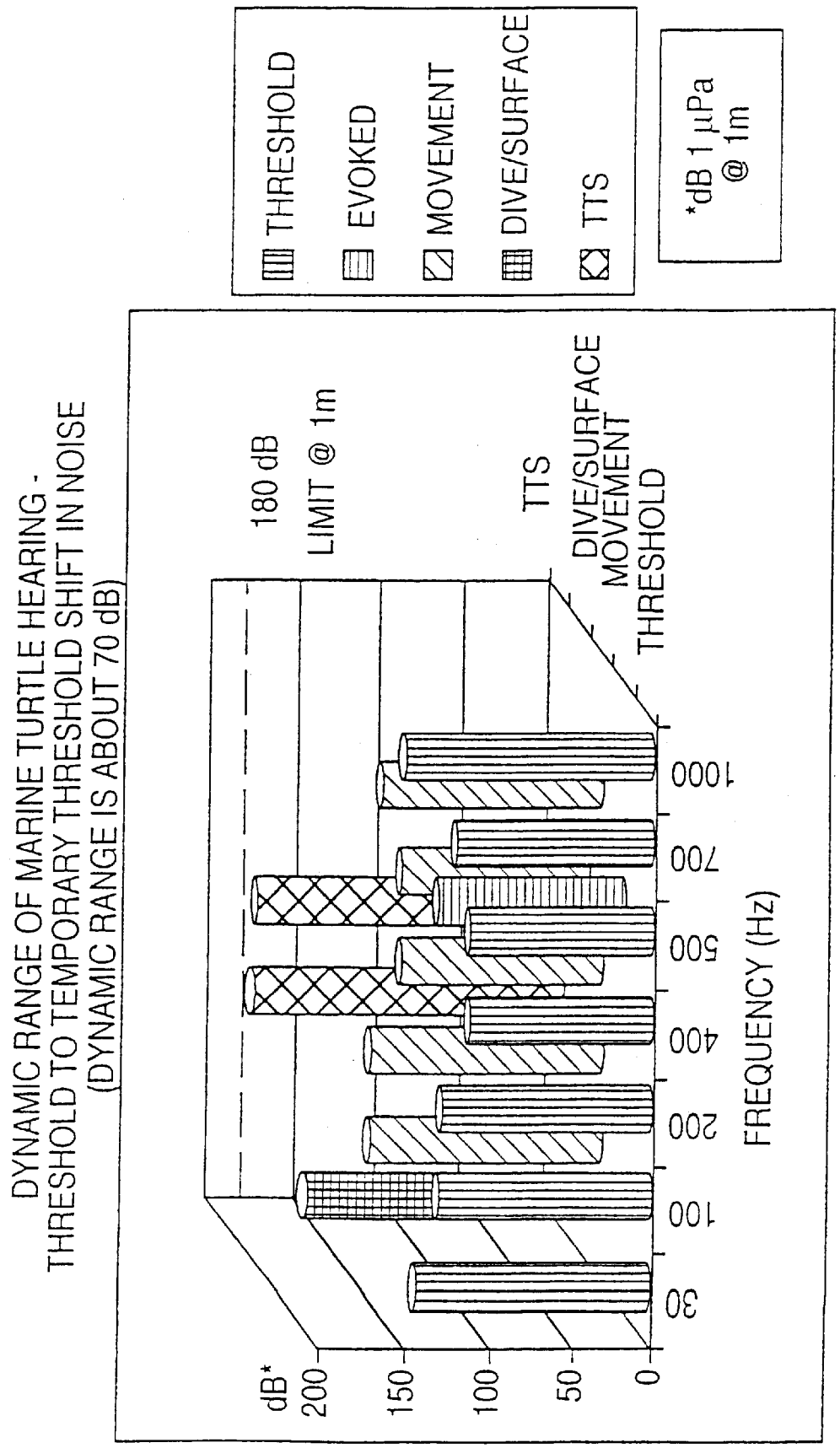
FIG. 3 shows a three-dimensional plot of the dynamic range of marine turtle hearing.

The behavioral data is converted to equivalent sound pressure in water, the convention of underwater acoustics. Swimming movement is induced at about 15 dB above threshold. The relationship between sound threshold in water and movement induced levels is presented in FIG. 3. Also depicted is the evoked potential response (ABR) to a low frequency acoustic transient. This physiological response of the inner ear nerve and brain is an "objective" measure of hearing threshold; i.e., no behavior response of the turtle is required. This threshold is very close to the behavioral threshold and the inner ear electrical threshold (as obtained from Ridgway et al.), suggesting validity.

The sound pressure of any alerting system must be near the movement threshold levels to have a probability of eliciting a behavioral response. Very low frequencies (~30 Hz,) can elicit a diving response in surface swimming turtles and a surfacing response in bottom dwelling turtles. This behavior is important in orientating turtles during coastal dredging operations. The levels that produced temporary threshold shifts (TTS) in hearing are depicted. TTS are a well documented hearing effect in mammals exposed to excessive noise. The TTS in turtles was observed in air gun exposure and determined by evoked response testing. Therefore, the limits or range of marine turtle hearing can be determined by:

$$DR = TTS \text{ level} - t_h$$

where DR is the dynamic range, TTS level is the intensity of sound referenced in dB 1 $\mu$Pa @ 1 meter that alters the hearing threshold, and $t_h$ is the threshold of hearing. The dynamic range is approximately 70 dB, and the limit of sound exposure that does not produce permanent hearing loss is 180 dB SPL (water).

All turtles have an air-filled middle ear. This would appear to be a disadvantage for aquatic species while under water since it poses an impedance mismatch between sound in water and in the turtle's soft tissues. Again, it might be a compromise for animals that spend time in both mediums or is a conservative evolutionary structure. Regardless of the mechanism, the air bubble of the middle ear has an acoustic resonance that can be utilized in an alerting system. Wever and Vernon, in an article published in 1956, modeled the aquatic turtle (C. scripta) as a cylinder and reported a resonance of about 6000 Hz. The same methodology was applied to a range of marine turtle ears and the results are displayed in FIG. 4. With submersion, the middle air bubble volume is reduced by about 50%. The range of the middle ear resonance is calculated to be between 900 and 11,000 Hz. Hatchlings would have much higher resonance in the low ultrasonic range. Note also when the *C. mydas* of Ridgway et al. is calculated and plotted with that of *C. caretta*, there is excellent agreement in the data.

When animals submerge, the middle ear volume decreases as a function of depth. Using Boyles Law, the volume was calculated at depths of 25 and 50 meters in experiments performed by the inventor. Since turtles typically do not dive below 50 meters (with the exception of the leatherback turtles), the upper range of middle ear resonance will be about 25,000 Hz.

Preferred Embodiments

The system and method of the present invention provides three classes of stimuli: low frequencies (<200 Hz), the most sensitive frequencies (200–900 Hz), and middle ear resonant frequencies (900–25,000+Hz), as shown in FIG. 5. In the acoustical mode, each type of signal can be projected from a standard source into the water. Such a standard acoustic source may correspond to Device # USN J-9 or USN J-15, available from the U.S. Navy's Underwater Sound Reference laboratory in Orlando, Fla. In the present invention, signals may be tonal or complex, pulsed or modulated. Depending upon the depth and bottom conditions, spherical or cylindrical spreading will typically occur. In either case, sound will propagate over a wide area. If turtles are in the immediate proximity to a fixed source, this may suffice to trigger an alarm and deterrent effect. Low frequencies will trigger diving/surfacing behaviors (depending on the turtle), mid range frequencies will be detected best in high ambient backgrounds, and middle ear resonant frequencies afford a third class of frequencies (corresponding to the upper range of acoustic frequencies). With a moving source such as a dredge, a more restrictive area of activation over a larger distance is desirable.

When an ultrasonic signal is used as a carrier for an acoustic signal which corresponds to configuration #4 in FIG. 5, the ultrasonic signal hits the turtle shell, thereby demodulating the ultrasonic signal. The resultant lower-frequency acoustic signal (that was being carried by the ultrasonic signal) is then received and heard by the turtle, and acts on the air bubble in the turtle's ear so as to cause a startling effect on the turtle.

To focus and propagate low frequencies over longer distances than naturally possible, ultrasonic amplitude modulation can be employed, where the ultrasonic frequency utilized acts as the carrier frequency for carrying the acoustic signal. Ultrasonic amplitude modulation is provided by multiplying (mixing) any of the three classes of acoustic signals by either low frequency ultrasound (25–100 kHz) or a MHz (0.1 MHz to 10 MHz) carrier. The resultant signal will propagate as ultrasound until it is demodulated due to the non-linearities in the water (e.g. seaweed) or when a turtle swims into the beam. By using ultrasound or MHz amplitude modulation, focusing on only turtles in the beam will elimination habituation by turtles in the immediate area but will not put them in any danger or harm them. In the acoustic case, the spherical spreading of sound will stimulate all animals that come into the range of the acoustic signal and that are capable of hearing the acoustic signal.

The acoustic signals are preferably delivered through a standard acoustic projector, such as Model # J-9, available from the U.S. Navy. The ultrasonic signals are preferably delivered through a standard ultrasonic focusing transducer, such as Model # AT13978, available from Blatek Inc. (assembled in a array). Of course, other types of acoustic and ultrasonic transducers may be utilized with the present invention. In addition, the acoustic signals can be delivered to a vibrating bar that can be placed in front of a source as a boat like a cowcatcher on a locomotive, such as the vibrating bar 610 shown on a vessel 620 in FIG. 6. The vibrating bar 610 is connected to the vessel 620 by cables 630. The resultant wing-shaped device is not only an effective vibrating element, but also acts as a sound projector. The vibrating bar 610 is also effective in delivering intense sound energy directly to the shell of the turtle (bone conduction to the ear). Stimulation in this fashion (in a large tank) elicits a strong and vigorous acoustic startle and escape avoidance behavior.

In a second embodiment, either synchronous or asynchronous (e.g., preprogrammed) patterns (as increasing in frequency etc.) of white or filtered light (within the visual resolution of the marine turtle eye) can accompany the acoustic and/or ultrasonic signals, thereby providing three different types of sensorial stimuli. Combining light and sound is an improvement over conventional fish acoustical deterrents. Coupling the light with sound will stimulate specific neurons in the turtle brain that only fire when multisensory stimulation is provided. Based on his research, the inventor believes that there is a connection between the tactile receptors in the turtle shell and the auditory fibers of the turtle. The use of multisensory stimulation is a feature of the turtle alerting apparatus and method according to the second embodiment. Four different modes of stimulation are depicted in FIG. 7, with any combination of these modes being possible to provide a multisensory stimulation. The tactile vibration corresponds to the actual contact of a turtle with the vibratory bar 610 of FIG. 6. In the second embodiment, the light is pulsed, which may be done either synchronously or asynchronously with respect to the other modes of stimulation (e.g., the ultrasonic signals or the acoustics signals).

Figure 8:
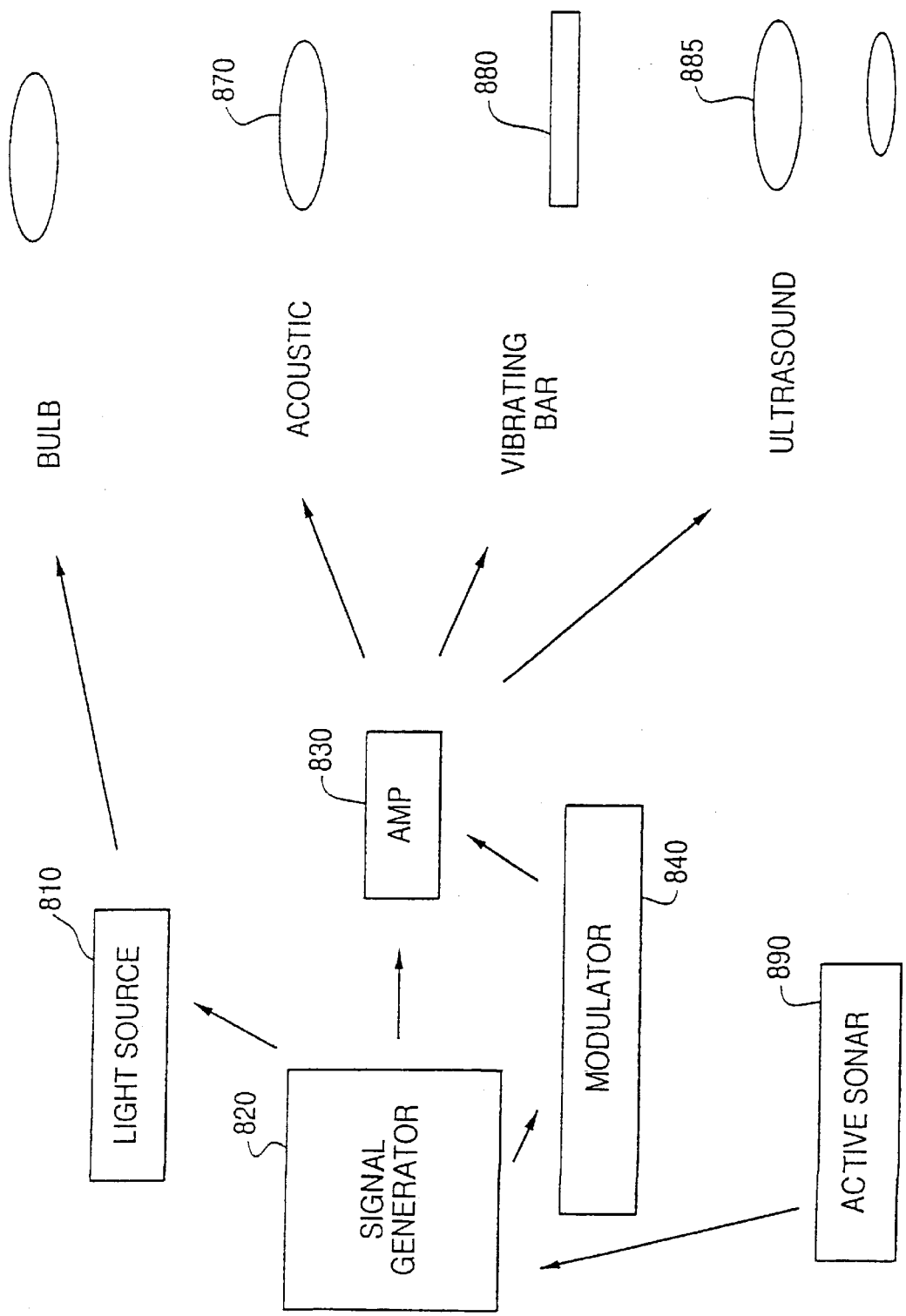
FIG. 8 shows a complete system in block diagram form that can implement any of the three embodiments of the invention.

In a third embodiment, the system and method of the invention also uses an active sonar system to identify turtles. In the third embodiment, only when turtles are identified would the deterrent/alerting system activate, thus keeping acoustic and/or ultrasonic radiation to a minimum. A block diagram of a system that provides all types of multi-sensor stimulation is shown in FIG. 8. Light source 810, such as a white light source or bulb, outputs a visual reinforcement that accompanies the acoustic and/or ultrasonic signal. A signal generator 820 provides an acoustic signal, which is amplified by amplifier 830 and which is output to a body of water using an acoustic transducer 870 and/or a vibratory bar 880. Modulator 840 provides for amplitude modulation of the acoustic signal output from the signal generator 820, thereby providing an ultrasonic signal as a carrier for an acoustic signal, to be output by way of an ultrasonic transducer 885. An active sonar 890 monitors the body of water for turtles, and thereby provides a signal to the signal generator which is used to steer the output signals in a direction where masses that may be turtles were detected by the active sonar 890. For example, the acoustic transducer 870, the vibratory bar 880, and the ultrasonic transducer 885 can be focused to output signals in only a particular direction, based on the output from the active sonar 890.

The use of ultrasonic frequencies provides an extended range of frequencies above the acoustic frequency range. This is important in providing a signal that is above the ambient noise in the water, such as shipping noise typically operates at 500 Hz, and below.

Some types of marine turtles tend to bury themselves in the bottom of a body of water, and in order to startle those turtles, a very low frequency signal is needed. For hat case, ultrasonic signals will tend to just reflect off the bottom surface, but lower-frequency signals, such as low-frequency acoustic signals, will reach the turtles submerged in the bottom surface of the water body, thereby causing those turtles to swim to the surface as they are startled. This is important in protecting turtles when dredging operations are performed. Thus, a combination of acoustic signals and ultrasonic signals is effective in marine environments in which ambient noise is present, and where turtles buried in the bottom of a body of water and also turtles swimming within he body of water are to be alerted to a vessel or a dredger.

The ultrasonic signals will demodulate as they impinge on the shell of the turtle, and the remaining acoustic signal will be received by the turtle's auditory system and cause the turtle to be startled. At some distance from the source (~15–20 m), the non-linearities in sea-water will also cause demodulation. Nonetheless, the demodulated low frequencies will still be in a narrow beam.

Also, the present invention may be implemented so as to provide a random or pseudo-random selection of at least one of the multi-sensor simulations over a period of time. That way, there is a lessened possibility that turtles will get accustomed to the same stimulation signals over time, and thus be inclined to ignore those stimulations. By providing a periodic, random or pseudo-random selection of stimulations, such as light and low-frequency acoustic stimulation in a first time frame (e.g., a first 10 second period), ultrasonic and middle-frequency acoustic simulation in a second time frame (e.g., a second 10 second period), light and high-frequency acoustic stimulation in a third time frame (e.g., a third 10 second period), the turtles will not tend to habituate based on the same signals being sent to them over a period of time. In such a system, when light is utilized, it should be utilized with another sensorial element. The time frames may be varied between a few seconds up to a few hours in length, and can be set based on data obtained from previous uses of the present invention that appear to provide the best results.

Also, based on an acoustic or ultrasonic signal provided according to the present invention, a turtle will be startled and will tend to swim in a direction that it is currently facing. The present invention utilizes multi-sensor signals so as to steer any turtles facing the danger (ship's hull) away from that danger. For example, after the ultrasonic and/or acoustic signal is provided in the water so as to startle a turtle, a light beam can then be provided soon thereafter (e.g., 1 second later), so as to direct the turtle away from the light and thus the danger. The turtle's visible spectrum is basically the red/yellow/blue spectrum, and pulsed light in this spectrum can be utilized together with sound signals in order to cause the turtle to move away in a safe direction. The light may alternatively be white light tat is pulsed, and the pulse rate of the light may be increased or ramped in order to cause a better visual startling effect.

Thus, the present invention can utilize either a simultaneous, multi-sensorial simulation, or a single-sensor stimulation that changes the sensor type (visual, acoustic, ultrasonic) periodically or randomly.

While FIG. 8 shows an embodiment in which a single signal generator 820 is used to generate one, two or three acoustic signals, signal generation may alternatively be accomplished by using two, three or more separate signal generators, which can be controlled by a single controller or which can operate asynchronous with respect to each other. Also, the output of the signal generator or generators may be provided to a single transducer or separate transducers that output a plurality of acoustic and/or ultrasonic signals, or to separate transducers that operate within particular frequency bands of interest (e.g., a first transducer to output a low acoustic frequency signal, a second transducer to output a mid acoustic frequency signal, a third transducer to output the high acoustic frequency).

Furthermore, based on the characteristics of the body of water, the present invention can be adapted to suit that body of water. For example, for shallow water, higher frequency signals provide for better propagation of those signals in the water. Thus, use of a MHz-range instead of an ultrasonic-range carrier would be better for propagating acoustic signals according to the invention in such bodies of water.

While preferred embodiments have been described herein, modification of the described embodiments may become apparent to those of ordinary skill in the art, following the teachings of the invention, without departing from the spirit and scope of the invention as set forth in the appended claims.

What is claimed is:

1. A turtle alerting system, comprising:
    an acoustic signal generator for generating at least one of a first acoustic signal of less than 200 Hz, a second acoustic signal of between 200 Hz, and 900 Hz, and a third acoustic signal of between 900 Hz, and 15 kHz;
    an amplitude modulator for amplitude modulating at least one of the first, second and third acoustic signals with an ultrasound carrier to thereby provide at least one of first, second and third ultrasound-modulated signals; and
    an output device for outputting the at least one of the first, second and third acoustic signals and the at least one of the first second and third ultrasound-modulated signals,
    wherein the amplitude modulator is provided between the acoustic signal generator and the output device, and
    wherein the at least of the first, second and third acoustic signals and the at least one of the first, second and third ultrasound-modulated signals affect an auditory system of a turtle in order to alert the turtle and cause movement of the turtle.

2. The turtle alerting system of claim 1, wherein the first, second and third acoustic signals are tonal signals.

3. The turtle alerting system of claim 1, wherein each of the first, second and third acoustic signals are generated by the acoustic signal generator and outputted by the output device.

4. The turtle alerting system of claim 1, wherein the output device comprises a vibrating bar that vibrates in accordance with the first, second and third acoustic signals.

5. The turtle alerting system of claim 1, further comprising a light delivery system for delivering light energy,
    wherein the light delivery system causes an alerting action of the turtle so as to result in a multi-sensory alerting system.

6. The turtle alerting system of claim 1, wherein the turtle alerting system provides underwater acoustic signals for alerting marine turtles.

7. The turtle alerting system of claim 5, wherein the turtle alerting system provides underwater acoustic and light signals for alerting marine turtles.

8. The turtle alerting system of claim 1, wherein the at least one of the first, second and third ultrasound-modulated signals is demodulated when it comes into contact with a shell of the turtle, thereby providing the acoustic signal to a hearing system of the turtle in order to alert the turtle.

9. A marine turtle alerting system, comprising:
    an acoustic signal generator for generating a first acoustic signal of less than 200 Hz, a second acoustic signal of between 200 Hz, and 900 Hz, and a third acoustic signal of between 900 Hz, and 15 kHz;
    an acoustic output device for outputting at least one of the first, second and third acoustic signals;
    a frequency multiplier for modulating the first, second and third acoustic signals with an ultrasound carrier so as to create a first, second and third ultrasonic signal, respectively;
    an ultrasonic output device for outputting at least one of the first, second and third ultrasonic signals; and
    a selector for selecting, in a random or pseudo-random manner, one of the first, second and third acoustic signals to be output by the acoustic output, along with one of the first, second, and third ultrasonic signals to be output by the ultrasonic output device, as a pair of output signals that are output during one time interval,
    wherein the first, second and third acoustic signals and the first, second and third ultrasonic signals affect an auditory system of a marine turtle in order to alert the marine turtle and cause movement of the marine turtle, and
    wherein the selector operates such that the marine turtle is provided with different pairs of signals for different contiguous time intervals, so that the marine turtle does not become accustomed to any one particular pair of output signals.

10. The turtle alerting system of claim 9, wherein the ultrasonic output device is an ultrasonic focusing transducer.

11. The turtle alerting system of claim 9, wherein the ultrasonic frequency range is a range of between 15 kHz and 100 kHz.

12. A turtle alerting system of claim 9, further comprising a light delivery system for delivering a light energy signal, wherein the light delivery system causes an alerting action of the marine turtle so as to result in a multi-sensory alerting system, and wherein the selector selects any two of the first, second, and third acoustic signals, the first, second and third ultrasonic signals, and the light energy signal, as the pair of output signals to be output during the one time interval.

13. The turtle alerting system of claim 9, wherein the at least one of the first, second and third ultrasonic signals is demodulated when it comes into contact with a shell of the turtle, thereby providing the acoustic, signal to a hearing system of the turtle in order to alert the turtle.

14. A marine turtle alerting system, comprising:

an acoustic signal generator for generating a first acoustic signal of less than 200 Hz, a second acoustic signal of between 200 Hz, to 900 Hz, and a third acoustic signal of between 900 Hz, and 15 kHz;

an acoustic output device for outputting the first, second and third acoustic signals;

a modulator for modulating the first, second and third acoustic signals with an ultrasound signal so as to create a first, second and third modulated signal, respectively; and an output device for outputting the first, second and third modulated signals, wherein the first, second and third acoustic signals and the first, second and third modulated signals affect an auditory system of a turtle in order to alert the turtle and cause movement of the turtle, and wherein the first, second and third acoustic signals operate to alert the turtle when the turtle is located at or near a bottom surface of a body of water in which the turtle is located, and the first, second and third modulated signals operate to alert the turtle when the turtle is located at or near a top surface of the body of water or in a middle depth region of the body of water.

15. The turtle alerting system of claim 14, wherein the output device is a focusing transducer.

16. The turtle alerting system of claim 14, further comprising an amplitude modulator for amplitude modulating the at least one of the first, second and third multiplied signals.

17. The turtle alerting system of claim 14, further comprising a light delivery system for delivering light energy, wherein the light delivery system causes an alerting action of the turtle so as to result in a multi-sensory alerting system.

18. The turtle alerting system of claim 14, wherein the turtle alerting system provides underwater acoustic signals for alerting marine turtles.

19. The turtle alerting system of claim 17, wherein the turtle alerting system provides underwater acoustic and light signals for alerting marine turtles.

20. The turtle alerting system of claim 14, wherein the first, second and third modulated signals are demodulated when they come into contact with a shell of the turtle, thereby respectively providing the first, second and third acoustic signals being carried by the ultrasound signal to a hearing system of the turtle in order to alert the turtle.

21. A marine turtle alerting method, comprising:

generating a first acoustic signal of less than 200 Hz, a second acoustic signal of between 200 Hz, and 900 Hz, and a third acoustic signal of between 900 Hz, and 15 kHz;

amplitude modulating the first, second and third acoustic signals with an ultrasound carrier to provide first, second and third modulated signals;

outputting the first, second and third acoustic signals and the first, second and third modulated signals, wherein the first, second and third acoustic signals affect an auditory system of a turtle in order to alert the turtle and cause movement of the turtle, and wherein the first, second and third acoustic signals operate to alert the turtle when the turtle is located at or near a bottom surface of a body of water in which the turtle is located, and the first, second and third modulated signals operate to alert the turtle when the turtle is located at or near a top surface of the body of water or in a middle depth region of the body of water.

22. The turtle alerting method of claim 21, wherein the first, second and third acoustic signals are tonal signals.

23. The turtle alerting method of claim 21, wherein the outputting step comprises vibrating a vibratory bar in accordance with the at least one of the first, second and third acoustic signals.

24. The turtle alerting method of claim 21, further comprising:

providing light energy; and outputting the light energy, wherein the outputted light energy causes an alerting action of the turtle so as to result in a multi-sensory alerting method.

25. The turtle alerting method of claim 21, wherein the turtle alerting method provides underwater acoustic signals for alerting marine turtles.

26. The turtle alerting method of claim 24, wherein the turtle alerting method provides underwater acoustic and light signals for alerting marine turtles.

27. A marine turtle alerting system, comprising:

an acoustic signal generator for generating a first acoustic signal of below 200 Hz, a second acoustic signal of between 200 Hz, and 900 Hz, and a third acoustic signal of between 900 Hz, and 15 kHz; and an output device for outputting the first, second and third acoustic signals, wherein the first, second and third acoustic signals affect an auditory system of a turtle in order to alert the turtle and cause movement of the turtle, and wherein, when the turtle is located at or near an upper surface of a body of water or at or near a bottom surface of the body of water, the first acoustic signal causes the turtle to be alerted and move away from the upper surface or the lower surface, respectively, and wherein the second acoustic signal corresponds to a most sensitive aural frequency range of the turtle in order to cause the turtle to be alerted and thereby move, and wherein the third acoustic signal corresponds to a middle ear resonant frequency of the turtle in order to cause the turtle to be alerted and thereby move.

28. The turtle alerting system of claim 27, wherein the first acoustic signal is at a frequency of 30 Hz.

* * * * *